F. N. ROEHRICH.
CHECK VALVE MECHANISM.
APPLICATION FILED MAY 12, 1913.
1,217,106.
Patented Feb. 20, 1917.
2 SHEETS—SHEET 1.
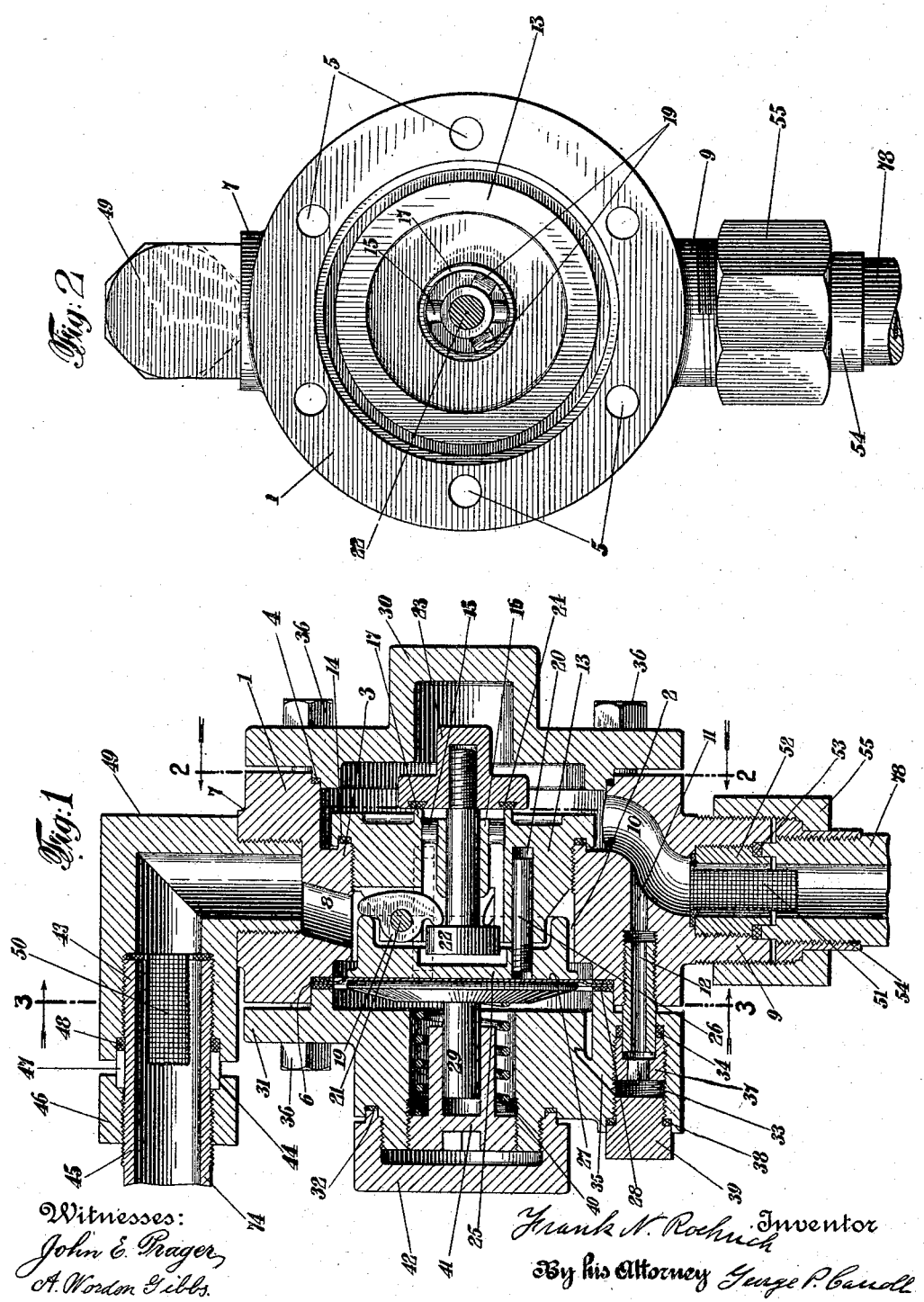

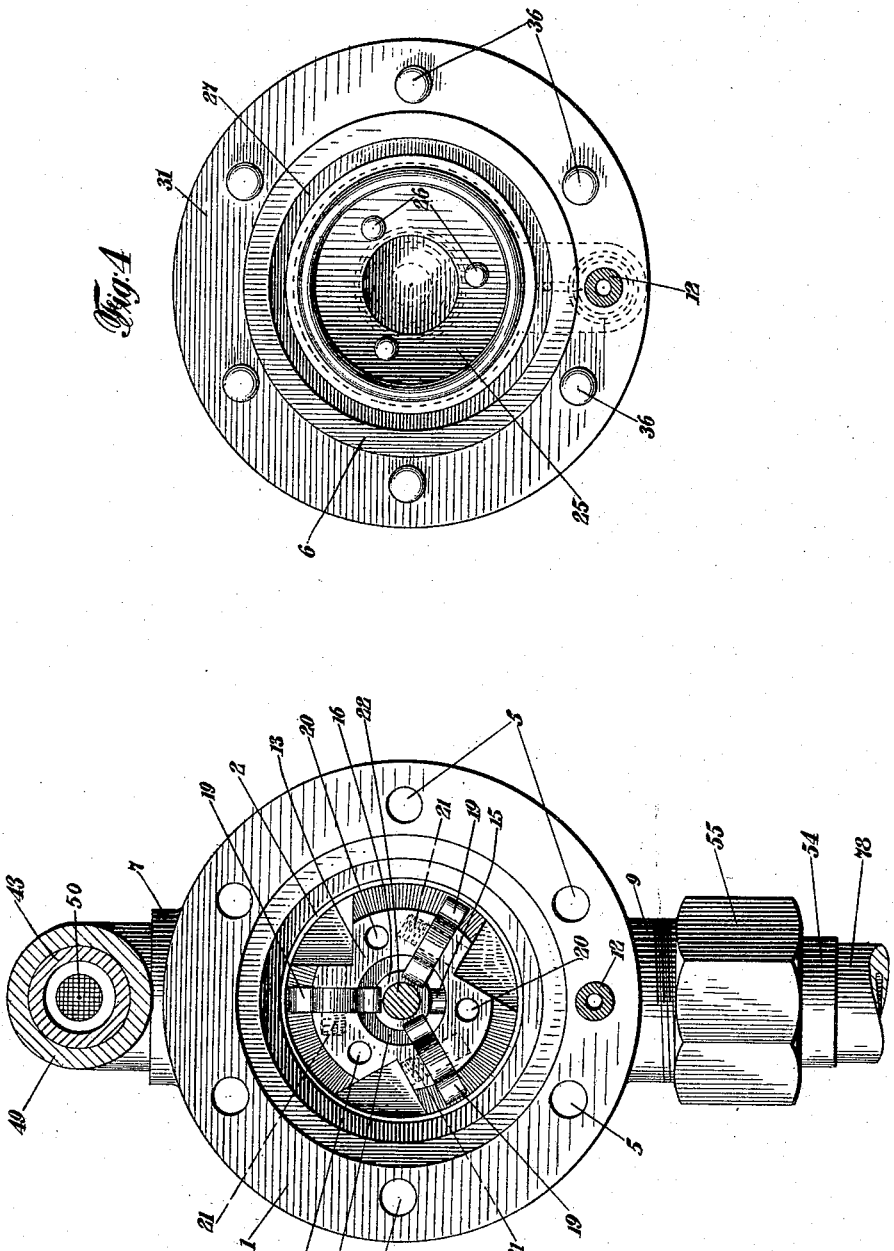

UNITED STATES PATENT OFFICE.

FRANK N. ROEHRICH, OF JERSEY CITY, NEW JERSEY, ASSIGNOR TO GEORGE P. CARROLL, OF BRIDGEPORT, CONNECTICUT.

CHECK-VALVE MECHANISM.

1,217,106.  Specification of Letters Patent.  Patented Feb. 20, 1917.

Application filed May 12, 1913. Serial No. 767,036.

*To all whom it may concern:*

Be it known that I, FRANK N. ROEHRICH, a citizen of the United States, residing at the city of Jersey City, county of Hudson, and State of New Jersey, have invented a new and useful Check-Valve Mechanism, of which the following is a specification.

My invention relates to improvements in the means for actuating check valves, especially where such valves are used to control the inflow of expanded ammonia vapor or gas into the stills of intermittent absorption refrigerating machines. My purpose is to provide simple, efficient and economical means whereby a check valve, especially where so used, shall close absolutely tight as soon as the pressure on its outflow side begins to exceed the pressure on its inflow side, and shall open when such former pressure falls a little below such latter pressure. The means employed for accomplishing this purpose are disclosed in the accompanying drawings and in the description relating thereto. There are also certain detail improvements of construction as will also so apper.

In the drawings Figure 1 is a vertical section of my invention, with some of the interior parts, however, shown in front elevation. Fig. 2 is a partial vertical section through the line 2—2 of the preceding figure, looking toward the left, and a partial right end elevation of certain parts thereof. Fig. 3 is a partial vertical section of the structure of Fig. 1 through the line 3—3 thereof, looking toward the right, and a partial left end elevation of certain parts thereof, but with a valve stem 22 shown in vertical section. Fig. 4 is a right hand elevation of certain of the parts removed from Fig. 1 so as to show in Fig. 3 certain of the remaining parts in left end elevation, except that a pressure transmitting pipe 12 is shown in vertical section.

A main casing 1 has a horizontal cylindrical opening 2, axially coincident with itself and internally threaded at its right end. The right end of the casing 1 is counterbored; it has an annular recess, to the left of its counterbored part, so as to leave an annular tongue 3 around the right threaded end of the opening 2; and it has an annular gasket recess, around the right end of its counterbored part, to receive a gasket 4, preferably of lead. Six bolt holes 5 extend through the casing 1, from end to end, outside its gasket recess. The left end of the casing 1 is also counterbored outside of the left unthreaded end of the opening 2 and it has an annular gasket recess, around the left end of this counterbored part, but within the line of the bolt holes 5, to receive a gasket 6, preferably of lead. On the top of the casing 1 is a slight vertical boss 7, within which is a vertical threaded recess. A slightly diagonal passage 8 extends downward from the recess in the boss 7 into the unthreaded part of the opening 2. From the under-side of the casing 1 there extends downward a boss 9, having a vertical recess, being threaded both externally and internally within the recess and having a gasket recess at the lower end of its internally threaded recess. A passage 10 extends from the right counterbored part of the casing 1, to the left of the opening 2, into the threaded recess of the boss 9. From the passage 10 a small pressure transmitting passage 11 extends to the left end of the casing 1 and is counterbored and threaded at its left end and for most of its length. A short pressure transmitting pipe 12, externally threaded at its right end and for most of its length, is tightly screwed into the threaded part of the passage 11, so as to leave an unthreaded section projecting from the left end of the casing 1. The passage through the pipe 12 and the unthreaded part of the passage 11 are preferably of substantially the same diameter.

A seat piece 13 has a main part, of substantially the same length as the narrower part of the opening 2, with an unthreaded part thereof of substantially the same length as the narrow unthreaded part of the opening and occupying the same, and with a threaded part screwing into and occupying the threaded part of the opening; it has, to the right of its main part, a flange, having a deep recess in the left surface of the flange containing a gasket 14, preferably of lead, so that, when the piece is screwed into the opening 2, the tongue 3 compresses the gasket within the recess and is itself surrounded by the outer rim of the flange so as to make a gas tight joint; it has an axial cylindrical passage extending through it, except that across the passage, near its right end, is a bridge 15 supporting a guide sleeve 16, axially coincident with the passage; it has, in its right end surface, a shallow annular recess surrounding a highly convex valve seat 17, at the right end of its passage; it has, in its left end, three equidistant lever slots, extending from the outer circumference of the piece to its passage and severally containing three short, centrally pivoted levers 19; it has, between its lever slots, three small cylindrical recesses 20, extending from the left end of the piece nearly to its right end; and it has, on one side of each lever slot and between it and an adjacent recess 20, a recess extending from the left end of the piece substantially as far as the depth of the lever slots and having two wall surfaces at right angles to each other. From each of these latter recesses in the piece 13, a machine screw 21, threaded only at its extreme inner end, is screwed into a screw hole in the piece that extends beyond the adjacent lever slot and is threaded only in its part beyond the slot. A screw 21 thus serves as the pivot for each lever 19.

A headed stem 22 has the right surface of its head in contact with the inner ends of the levers 19; it has a cylindrical shank extending through and adapted to reciprocate in the sleeve 16; and it has a threaded right end, extending beyond the seat 17. A valve piece 23 has a central threaded recess into which the stem 22 is screwed and it has in its left surface an annular recess, containing a ring 24, preferably of tin, that is adapted for seating on the seat 17. The parts 22, 23 and 24 constitute one form of lift valve for closing the seat 17.

A motor member 25 has a plane left surface; it has, at its circumference and on its extreme right, a highly convex rim bearing upon the outer ends of the levers 19; it is so recessed on its right side as to be always spaced away from the other parts of the levers and from the stem 22; and it has extending through it three threaded bolt holes, registering with the recesses 20. Three guide rods 26, threaded only at their extreme left ends, are screwed into the bolt holes of the member 25 and occupy and are adapted to reciprocate in the recesses 20. A very thin diaphragm 27, preferably of vanadium steel, at its rim covers the gasket 6 and bears against the left surface of the member 25. A gasket 28, preferably of lead and corresponding to the gasket 6, rests upon the outer circumference of the diaphragm 27. The exposed area of the diaphragm 27, on each side thereof, is much greater than the rear of the piece 23 that is exposed to the pressure of fluid in the passage through the piece 13. A flanged member 29 has a plane right surface, approximately of the same diameter as the plane left surface of the motor member 25, resting against the outer surface of the diaphragm 27 and it has a stem extending to the left from its axial center. The diameters of the plane surfaces of the member 25 and 29 are only a little less than the diameters of the exposed part of the diaphragm 27.

A flanged right cover 30 is spaced away from the piece 23, so as to permit of a full movement of the valve, and it has a flange compressing the gasket 4, so as to make a gas tight joint. A flanged left cover 31 has a flange compressing the gasket 28, so as to make a gas tight joint; it is spaced away from the flange of the flanged member 29 sufficiently to permit of reciprocating movements of the latter; it has a central opening through it, axially coincident with the stem of the flanged member and of considerably greater diameter and threaded at its outer end; it has, at its extreme left end, a section of reduced diameter and externally threaded; it has, in its surface adjacent to its section of reduced diameter, an annular recess containing a gasket 32, preferably of lead; it has an extension at its lower end, in which is a recess 33, extending from the left end of the extension almost to its right end, so as to leave a thin end wall; it has an opening through the end wall of the recess 33, so that the unthreaded end of the pipe 12 passes through the end wall and projects into the recess; it has in the recess 33, adjacent to its end wall, a section containing a gasket 34, preferably of lead, around the pipe 12; it has, for most of the length of the recess 33, internal threads and a gasket recess at the left end of the extension; and it has a small pressure transmitting passage 35 extending from the threaded part of the recess 33 to the hollow part of the cover adjacent to the outer edge of the flanged member 29. The covers 30 and 31 are provided, in their flanges, with bolt holes, registering with the holes 5, and are clamped to the casing 1 by means of bolts and nuts 36, the bolts passing through the holes in the casing and in the covers.

A nut 37, having a square internal wrench section of about the same area as the area of the passage through the pipe 12, is screwed into the recess 33, so as to surround the pipe and to compress the gasket 34, thus making a gas tight joint. A gasket 38, preferably of lead, occupies the gasket recess at the left end of the extension of the casing 1. A flanged plug 39 is screwed into the recess 33 so as to compress the gasket 38 with its flange and to make a gas tight joint, but so as to leave an unobstructed course for the flow of fluid through the passage 11, to pipe 12, the nut 37, the recess 33 and the passage 35. A helical compression spring 40 bears against the flange of the flanged member 29 and occupies most of the length of the opening through the cover 31. A headed sleeve 41, having in its externally threaded head an internal wrench section, whereby it is screwed into place, is screwed into the threaded outer end of the opening through the cover 31, so that its head bears against the left end of the spring 40 and so that its main part occupies a space between the spring and the stem of the flanged member 29 and guides the stem, when reciprocating. A cap 42 is screwed over the section of reduced diameter of the cover 31 and, by means of a tongue, compresses the gasket 32 within its recess so as to make a gas tight joint.

The outlet end of an expansion coil 74 has an externally threaded section 43 at its extreme end; it has, next to its section 43, an unthreaded section 44 of about equal length and of about the same external diameter as is the section 43 at the root of its threads; and it has, next to its section 44, another threaded section 45 in all respects like the section 43. A nut 46, counterbored at its right end so as to form a recess, is screwed over the section 43, is passed over the section 44 without engagement and is screwed back over the section 45. A ring 47 is placed around the section 44, next to the nut, and is adapted to occupy its recess; and next to the ring is placed a gasket 48, preferably of lead. An elbow 49 has an internally threaded recess at its left end, with a gasket recess at the left end of the threads. The flange of a wire covered scale strainer 50 occupies the extreme right of the recess in the elbow 49. The elbow 49 is screwed over the section 43 until the flange of the strainer 50 is clamped between the section and the elbow and until the gasket recess of the latter is opposite the right end of the section 44. The ring 47 and the gasket 48 are placed so that the gasket is entirely within the recess of the elbow 49 and the right end of the ring covers the gasket within the recess. The nut 46 is screwed forward over the ring 47 until the ring compresses the gasket 48 so as to make a gas tight joint. The other and under end of the elbow 49 is externally threaded, so as to register with the recess in the boss 7. The casing 1, at the boss 7, is screwed over the under end of the elbow 49 into the position shown in Fig. 1. The means here shown, for connecting the casing 1 and the expansion coil 74, are set forth and claimed in my application Ser. No. 717,142, filed Aug. 26, 1912, entitled Ammonia pipe union.

The flange of a wire covered scale strainer 51 occupies the extreme top of the recess in the boss 9. An externally threaded sleeve 52, having a shoulder at its lower end with a screw slot across the bottom of the shoulder, is screwed into the recess in the boss 9, so as to secure the strainer 51 in position. A gasket 53, preferably of lead, occupies a space in the boss 9 at the shoulder of the sleeve 52. An expanded gas pipe 78, leading into the top of a still, not shown, is externally threaded near its top and at its top has an annular tongue adapted to fit into the recess in the boss 9 over the gasket 53. A flanged and internally threaded sleeve 54 fits into an internally threaded cup coupling 55 and has its flange within and resting against the end wall of the coupling, while the part of the sleeve of reduced diameter passes through and below the coupling. The sleeve 54, is placed within the coupling 55, is screwed around the pipe 78 sufficiently far to leave exposed the tongue of the latter. After the sleeve 54 has been screwed in place, the coupling 55 is slipped downward, the pipe 78 and the boss 9 are brought together so that the tongue of the pipe enters the recess of the boss, and then the coupling is screwed up on the boss until the gasket 53 is so compressed as to make a gas tight joint. The means here shown, for connecting the casing 1 and the expanded gas pipe 78, are set forth and claimed in my application Ser. No. 732,049, filed Nov. 18, 1912, entitled Ammonia angle valve.

The positioning of a check valve between the outlet end of an expansion coil, or evaporator, and the inlet end of an expanded gas pipe leading into a still, is well known in the art; and its function, when so placed, is also well known. Such a check valve is the valve 2ª or 2ᵇ in the patent to Carroll, 978,557, Dec. 13, 1910. The position of the present valve structure, between the coil 74 and the pipe 78, is shown and described in the application of Carroll and Roehrich, Ser. No. 761,173, filed April 15, 1913, Check valve mechanism, being there numbered 77 in Fig. 5.

The method of operation is as follows: The spring 40 acts on the flanged member 29, the diaphragm 27, the motor member 25 and the outer ends of the levers 19 so that the inner ends of the levers bear on the head of the stem 22 in such a manner that the valve constantly tends to close the seat 17. The thrust of the spring 40 is preferably such that a force of only about three pounds is required to open the valve. During the absorption period of an intermittent absorption refrigerating machine, there is expanded ammonia vapor, under pressure from the coil 74, that continually passes through the strainer 50, the elbow 49, the passage 8, the opening 2 and the valve seat 17, with sufficient force to keep open the lift valve in opposition to the spring 40. For during such period, the absorbent water in the still draws the expanded ammonia from the pipe 78, the sleeve 52, the passage 10, and the passages connected therewith, with such effect that the spring 40 has no assistance in its tendency to close the valve.

But when the absorption period terminates and the heating period begins, the supply of liquid ammonia to the unshown inner end of the coil 74 ceases, and the pressure in the coil tends to be equal to that in the pipe 78. And when the pressure in the coil 74 is no longer about three pounds greater than the pressure in the pipe 78, the thrust of the spring 40 being as assumed, the spring becomes effective to close the valve. Such approximate equalization of pressure occurs, not merely in consequence of the cessation of the supply of ammonia to the coil 74, but also in consequence of the increasing heat of the still increasing the pressure of the ammonia gas expelled from the absorbent water. This increasing pressure manifests itself, not merely in unshown passages leading to a condenser, but also in the pipe 78, the sleeve 52, the passage 10 and the connections of the latter. Part of the gas ascending through the passage 10 exerts an increasing pressure on the outlet side of the piece 23, and thus assists the spring 40 in holding the valve tight, in the manner common with all check valves. And part of the gas so ascending passes through the passages 11 and 35 and their intermediate connections and exerts an increasing pressure on the outer side of the flanged member 29 and the diaphragm 27. Such latter pressure acts through the motor member 25 and the outer ends of the levers 19, so that the inner ends of the latter bear on the head of the stem 22 to make yet more effectual the complete closing of the valve. This latter pressure therefore has an intensive effect in closing the valve tight and supplements both the spring 40 and the ordinary pressure on the outlet side of the piece 23. It is apparent that, as the pressure in the still increases, the greater is this intensive effect.

When, finally, the heating of the still has terminated and it has begun to cool down, the pressures on the outer side of the flange 29 and the diaphragm 27 and on the outlet side of the piece 23 diminish simultaneously, until finally the spring 40 alone tends to close the valve. In this condition the cycle of operation is complete and the fluid under pressure in the coil 74 is once again operative to open the valve.

While the operation of my invention has been explained as a part of an intermittent absorption refrigerating machine, it is evident that the mechanism will operate in the same manner under similar conditions of pressure variations.

It will be noted that the sleeve 16 and the seat 17 are both formed on the same piece of material. Consequently the seat piece 13 can be accurately machined so that the axis of the guiding passage through the sleeve 16 will be at right angles to the plane of the seat 17, thus making possible a true and tight seating of the valve. With the accuracy of the seat piece 13 thus established, the stem 22 and the valve piece 23 can be rigidly connected, as shown. By means of this rigid connection, the necessity of a ball and socket joint between the stem and the valve piece is eliminated, there is no chance for leakage through the valve piece and the construction is simple and economical.

The three equidistant levers 19 exert an even pull on the head of the stem 22 that prevents the stem from binding in the sleeve 16. By making the flange member 29, the diaphragm 27 and the motor member 25 axially coincident with the casing 1, the valve structure is made very compact and the use of a plurality of levers 19 is made possible. This compactness of structure is increased by having the terminating passages 11 and 35, and their intermediate connections, within the limits of the casing 1 and the cover 31. By leading the passage 35 into that part of the cover 31 near the edge of the flange of the flange member 29, there is made possible a practically exterior means for adjusting the tendency of the spring 40 to close the valve. For, on unscrewing the cap 42, the sleeve 41 may be screwed farther in or farther out, so as to adjust the thrust of the spring 40, without permitting a free escape of ammonia.

What I have invented and what I desire to have protected by Letters Patent is expressed in claims as follows:

I claim:

1. In combination a chamber structure having an inlet, an outlet and a valve seat between them, a diaphragm in axial alinement with said seat and forming one wall of said structure on the inlet side of the seat, a valve for closing said seat, means operating on an inward movement of said diaphragm to close said valve but on an outward movement thereof permitting fluid under pressure from said inlet to open the valve, and means permitting a pressure of fluid in said inlet, slightly in excess of the pressure of fluid in said outlet, to force said diaphragm outward but in the absence of such excess forcing the diaphragm inward.

2. In combination a chamber structure having an inlet, an outlet and a valve seat between them, a diaphragm in axial alinement with said seat and forming one wall of said structure on the inlet side of the seat, a valve for closing said seat, means operating on an inward movement of said diaphragm to close said valve but on an outward movement thereof permitting fluid under pressure from said inlet to open the valve, a device tending to close said valve, and a cover casing inclosing said diaphragm at its edge and having a passage connecting said outlet with the space outside of the diaphragm.

3. In combination a chamber structure having an inlet, an outlet and a valve seat between them, a diaphragm in axial alinement with said seat and forming one wall of said structure on the inlet side of the seat, a valve for closing said seat, means operating on an inward movement of said diaphragm to close said valve but on an outward movement thereof permitting fluid under pressure from said inlet to open the valve, a cover casing inclosing said diaphragm at its edge and having a passage connecting said outlet with the space outside of the diaphragm, and a spring device in said casing tending to move said diaphragm inward.

4. In combination a chamber structure having an inlet, an outlet and a valve seat between them, a diaphragm forming one wall of said structure on the inlet side of said seat, a valve for closing said seat and having a stem extending through the seat with a head toward said inlet, a plurality of centrally pivoted levers having their inner ends adjacent to the side of said head toward said seat, a motor member adjacent to the central part of said diaphragm and also adjacent to the outer ends of said levers, a device tending to close said valve, and a cover casing inclosing said diaphragm at its edge and having a passage connecting said outlet with the space outside of the diaphragm.

5. In combination a chamber structure having an inlet, an outlet and a valve seat between them, a diaphragm forming one wall of said structure on the inlet side of said seat, a valve for closing said seat and having a stem extending through the seat with a head toward said inlet, a plurality of centrally pivoted levers having their inner ends adjacent to the side of said head toward said seat, a motor member adjacent to the central part of said diaphragm and also adjacent to the outer ends of said levers, a cover casing inclosing said diaphragm at its edge and having a passage connecting said outlet with the space outside of the diaphragm, and a spring device in said casing tending to move said diaphragm inward.

6. In combination a main chamber casing having an inlet, an outlet and an intermediate opening between them, a seat piece occupying a section of said opening, having a passage through itself with a valve seat around the end toward said outlet and having in said passage a guide sleeve supported by the outer part of the piece, a valve for closing said seat and having a stem extending through said sleeve and a head beyond the sleeve, a plurality of centrally pivoted levers having their inner ends adjacent to the side of said head toward said seat, a motor member adjacent to the central part of said diaphragm and also adjacent to the outer ends of said levers, a device tending to close said valve, and a cover casing inclosing said diaphragm at its edge and having a passage connecting said outlet with the space outside of the diaphragm.

7. In combination a main chamber casing having an inlet, an outlet and an intermediate opening between them, a seat piece occupying a section of said opening, having a passage through itself with a valve seat around the end toward said outlet and having in said passage a guide sleeve supported by the outer part of the piece, a valve for closing said seat and having a stem extending through said sleeve and a head beyond the sleeve, a plurality of centrally pivoted levers having their inner ends adjacent to the side of said head toward said seat, a motor member adjacent to the central part of said diaphragm and also adjacent to the outer ends of said levers, a cover plate casing inclosing said diaphragm at its edge and having a passage connecting said outlet with the space outside of the diaphragm, and a spring device in said casing tending to move said diaphragm inward.

8. In combination a chamber structure having an inlet, an outlet and a valve seat between them, a diaphragm forming one wall of said structure on the inlet side of said seat, a valve for closing said seat, means operating on an inward movement of said diaphragm to close said valve but on an outward movement thereof permitting fluid under pressure from said inlet to open the valve, a cover clamping said diaphragm at its edge, having an opening through itself threaded at the outer end and having a passage connecting said outlet with the space ouside of the diaphragm, a flanged member within said cover having its flange adjacent to the central part of said diaphragm and having a stem extending into said opening, a helical compression spring within said opening bearing upon the flange of said member, a longitudinally adjustable headed sleeve having its head screwed into the threaded end of said opening against the outer opening of said spring and having its main part surrounding and guiding said stem, and a detachable cap covering said opening.

9. In combination a chamber structure having an inlet, an outlet, a valve seat between them and a pressure transmitting passage connected with the outlet and terminating at one end of the structure, a diaphragm forming one wall of said structure on the inlet side of said seat, a valve for closing said seat, means operating on an inward movement of said diaphragm to close said valve but on an outward movement thereof permitting fluid under pressure from said inlet to open the valve, a device tending to close said valve, a cover casing inclosing said diaphragm at its edge and having a pressure transmitting passage terminating at its end opposite to the termination of said former passage, and a pipe connecting said passages.

FRANK N. ROEHRICH.

Witnesses:
A. WORDEN GIBBS,
WALTER L. MUEHLENBECK.